United States Patent
Angelopoulos (10) Patent No.: US 7,835,773 B2
(45) Date of Patent: Nov. 16, 2010

(54) SYSTEMS AND METHODS FOR ADJUSTABLE AUDIO OPERATION IN A MOBILE COMMUNICATION DEVICE

(75) Inventor: Athanasios Angelopoulos, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 703 days.

(21) Appl. No.: 11/087,170

(22) Filed: Mar. 23, 2005

(65) Prior Publication Data

US 2006/0217068 A1 Sep. 28, 2006

(51) Int. Cl.
H04B 1/38 (2006.01)

(52) U.S. Cl. .................. 455/570; 455/296; 455/307; 455/312; 379/390.02; 379/392.01; 381/71.11; 381/94.2

(58) Field of Classification Search ........... 455/569.1, 455/569.2, 570, 296, 306, 307, 312; 379/390.02, 379/391, 392, 392.01, 395; 381/71.1–71.14, 381/94.1–94.9

See application file for complete search history.

(56) References Cited

U.S. PATENT DOCUMENTS

| | | | | |
|---|---|---|---|---|
| 5,353,376 A * | 10/1994 | Oh et al. ................... 704/233 |
| 5,450,494 A * | 9/1995 | Okubo et al. ............... 381/57 |
| 5,535,433 A * | 7/1996 | Kurokawa et al. ........... 455/79 |
| 5,617,472 A * | 4/1997 | Yoshida et al. ......... 379/390.02 |
| 5,734,987 A * | 3/1998 | Shiono et al. .............. 455/570 |
| 5,790,671 A * | 8/1998 | Cooper ...................... 381/57 |
| 5,881,103 A * | 3/1999 | Wong et al. ................ 375/229 |
| 6,011,853 A * | 1/2000 | Koski et al. ................. 381/56 |
| 6,185,298 B1 * | 2/2001 | Hashimoto ............. 379/390.01 |
| 6,233,462 B1 * | 5/2001 | Kanai ..................... 455/567 |
| 6,516,068 B1 * | 2/2003 | Ciurpita et al. ............. 381/106 |
| 6,563,803 B1 * | 5/2003 | Lee ......................... 370/290 |
| 6,639,987 B2 * | 10/2003 | McIntosh ................ 381/71.6 |
| 6,744,882 B1 * | 6/2004 | Gupta et al. ............ 379/387.01 |
| 6,760,451 B1 * | 7/2004 | Craven et al. ............... 381/98 |
| 6,766,142 B2 * | 7/2004 | King ....................... 455/63.1 |
| 6,785,382 B2 * | 8/2004 | McLaughlin et al. .... 379/388.01 |
| 6,850,783 B1 * | 2/2005 | Romesburg ............... 455/570 |
| 7,024,230 B2 * | 4/2006 | Curtiss et al. ............ 455/569.1 |
| 7,130,794 B2 * | 10/2006 | Saito ....................... 704/205 |
| 7,283,850 B2 * | 10/2007 | Granovetter et al. ........ 455/570 |
| 2003/0003944 A1 * | 1/2003 | Rosenzweig ............... 455/550 |
| 2004/0057586 A1 * | 3/2004 | Licht ...................... 381/94.7 |
| 2004/0131201 A1 * | 7/2004 | Hundal et al. ............... 381/77 |
| 2004/0146168 A1 * | 7/2004 | Goubran et al. ........... 381/73.1 |
| 2006/0014570 A1 * | 1/2006 | Marx et al. .............. 455/569.1 |

* cited by examiner

Primary Examiner—Edward Urban
Assistant Examiner—RuiMeng Hu (57) ABSTRACT

A method for adjusting the volume and frequency response for the audio output in a mobile communication device comprises estimating the noise level of the environment surrounding the mobile communication device and then adjusting the volume and frequency response based on the estimated noise level.

20 Claims, 6 Drawing Sheets

FIG. 1

(Prior Art)

FIG. 6B

SYSTEMS AND METHODS FOR ADJUSTABLE AUDIO OPERATION IN A MOBILE COMMUNICATION DEVICE

FIELD OF THE INVENTIONS

The field of the invention relates generally to mobile communication systems and devices and more particularly to audio system for mobile communication devices.

BACKGROUND OF THE INVENTION

One drawback of using a mobile communication device is that the noise around a user of a mobile communication device can vary dramatically as the user travels from place to place. Further, since mobile communication devices are used in such a wide variety of environments, including outdoors, the noise around the user of the mobile communication device can vary even when the user is not traveling from place to place. The surrounding noise can cause several problems. For example, the noise, if loud enough can hinder the user's ability to hear a party on the other end of a call. As a result, mobile communication devices have been designed to include variable gain audio amplifiers, the gain of which can be adjusted based on the surrounding noise level. Thus, if it is determined that the surrounding noise level is too high, then the gain of the audio amplifier can be adjusted, which increases the volume of the audio output so that the user is better able to hear what the other party is saying.

Figure 1:
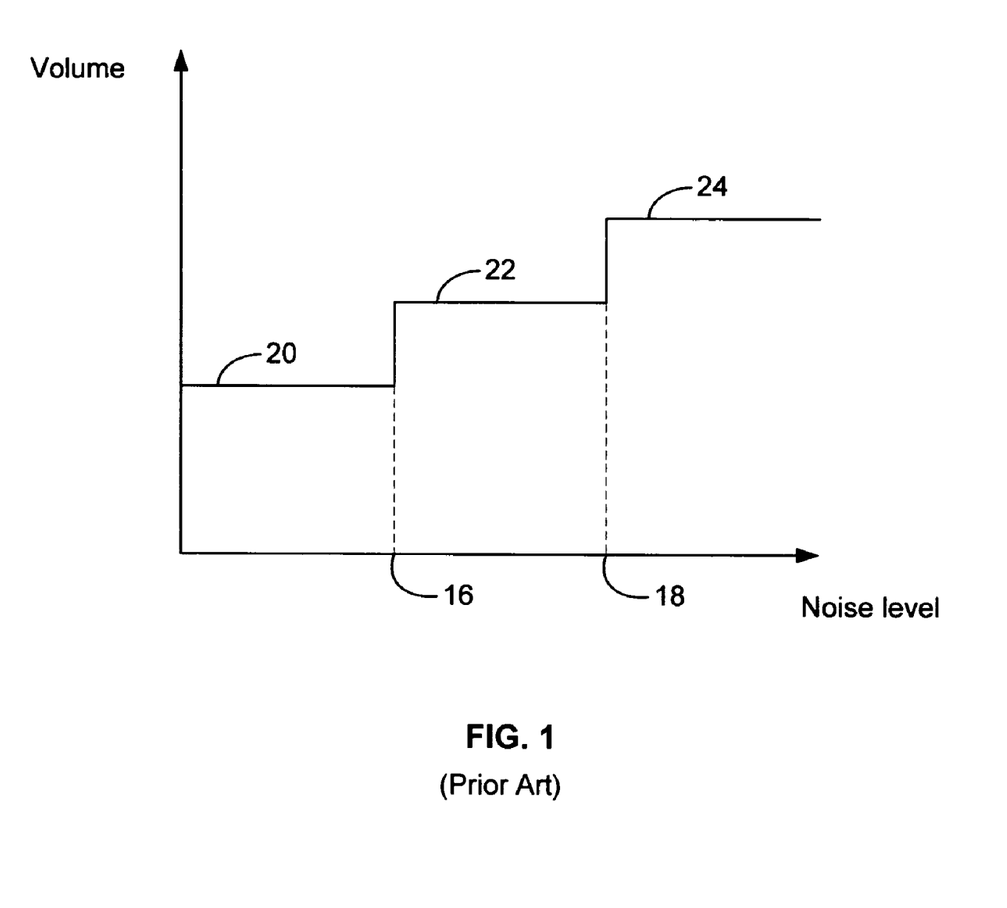
FIG. 1 is a graph depicting an exemplary volume response that adjusts the volume of a conventional audio system based on noise level.

FIG. 1 is a graph depicting an example gain curve for a device that can adjust the volume output by its audio system based on noise level, thereby increasing the Signal-to-Noise-Ratio (SNR) for the user of the audio output. The graph includes an x-axis that indicates noise level and a y-axis that indicates gain. Moving along x-axis, the gain applied to the audio output signal is at an initial level 20 until the noise level reaches a first threshold level 16. At the first threshold level 16, the gain is increased to level 22. As the noise level reaches a second threshold level 18, the gain is increased again from level 22 to level 24. Thus, as the noise level increases, the volume level of the audio output will increase as a result of the increased gain levels applied as each threshold is reached, which will in turn increase the SNR.

Accordingly, due to the increased SNR in noisy conditions, the user of such a device can, in some cases, better hear and understand the output of the audio system even in the face of noise. This is obviously due to the fact that, as the noise surrounding the device increases, the volume output is incrementally increased to counteract the surrounding noise. Depending on the implementation, different threshold noise levels and different gain steps can be used. Additionally, more, or fewer threshold noise levels can be used.

The simple approach to counteracting noise, depicted in FIG. 1, does have drawbacks. For example, the ability of the human ear to hear sound of different frequencies in a noisy environment can vary as noise level increases. In other words, tonal masking, wherein the audibility of one sound is reduced due to the presence of another sound at a close frequency, can cause a person to be able to hear some frequencies better than others. Additionally, the ability of a speaker device to reproduce sound accurately and without distortion can vary as volume is increased. This may limit how much the volume can be increased as the surrounding noise level increases. As a result, the approach depicted in FIG. 1 can be ineffective in many situations.

SUMMARY OF THE INVENTION

The disadvantages discussed above can be overcome by adjusting the frequency response of an audio system included in a mobile communication device responsive to the noise level around the mobile communication device. For example, if a speaker cannot reproduce low frequency sound as well, or clearly, as higher frequency sound, then it may not be worthwhile to attempt to reproduce the low frequency sound in the face of heavy interfering noise from the surrounding environment. Additionally, in some cases, filtering out some portion of the sound, for example, the low frequency sound, may enable the speaker to reproduce other frequency sound, for example mid and high frequencies, better. In other words, reproducing one frequency range may decrease the maximum volume level that the speaker can reproduce at another frequency range.

In one aspect, the noise level can be estimated by measuring the sound level received by the microphone. The noise level can be an average sound level received over a period of time.

In another aspect, the noise level can be compared to a threshold and the frequency response of an audio filter can be adjusted responsive to the comparison.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

Figure 2:
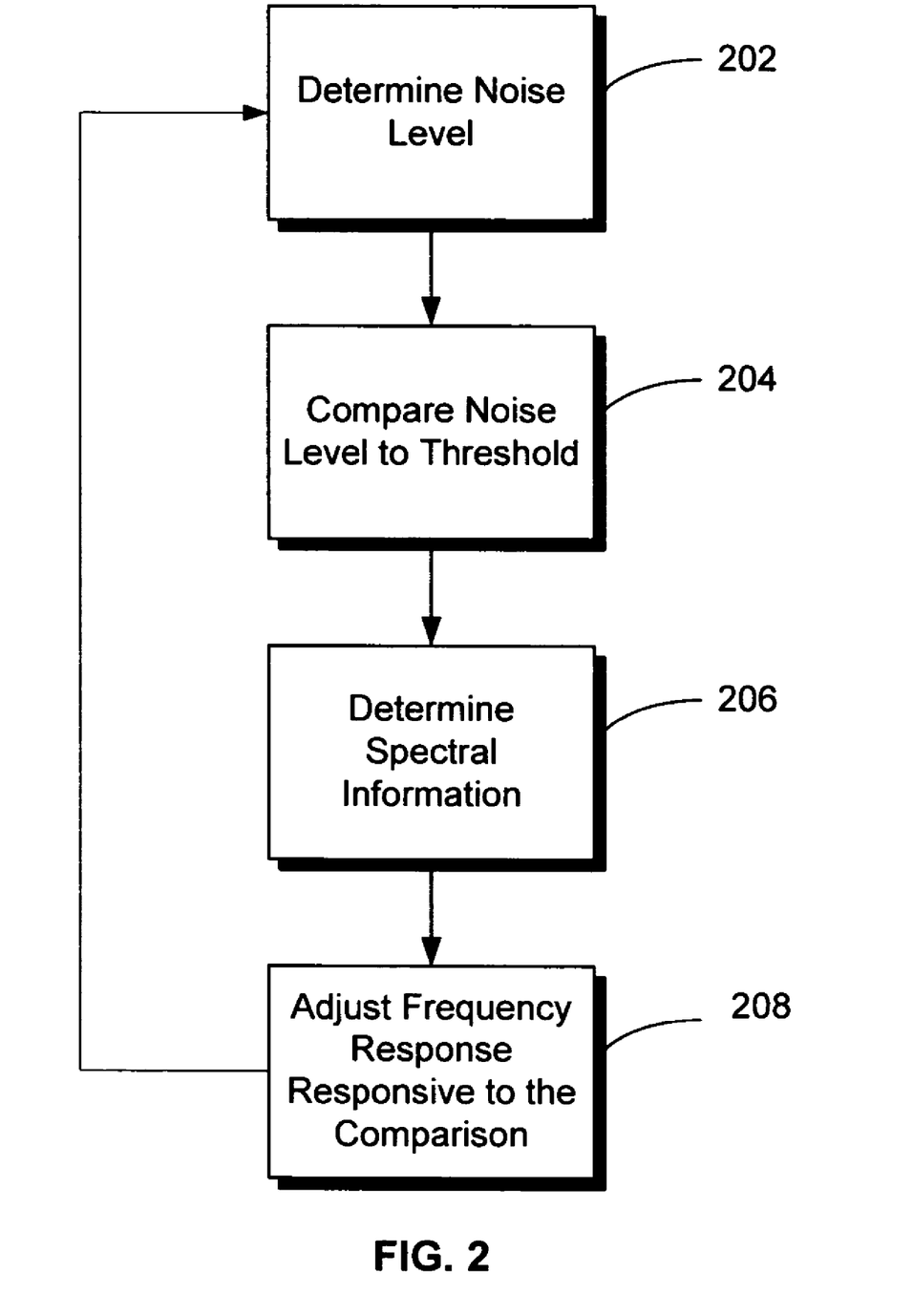
FIG. 2 is a flow chart illustrating an example process for adjusting the frequency response of a mobile communication device in accordance with one embodiment.

FIG. 2 is a flow chart illustrating an example process whereby a mobile communication device, such as a mobile telephone handset, can be configured to adjust frequency response based on surrounding noise level in accordance with one embodiment of the systems and methods described herein. The process begins in step 202, where the surrounding noise level can be determined, or estimated. The process continues to step 204, where the determined noise level can then be compared to a threshold in a similar manner as described above. The process can further continue in step 206, where spectral information related to the noise and/or audio signal can then be determined, and in step 208, where the frequency response of the audio output can then be adjusted in response to the threshold comparison and the spectral information.

The surrounding noise level can, for example, be determined, in step 202, using a microphone included in the mobile communication device. In one embodiment, for example, the noise level can be determined by a mobile station modem (MSM) coupled to the microphone. The microphone and MSM can form part of an audio system included within the mobile communication device. An exemplary audio system is described in more detail below.

The noise level determination in step 202 can include an averaging of several noise measurements. For example, a plurality of noise level measurements can be taken over a certain period of time, such as over a few seconds. The plurality of noise measurements can then be averaged together. It can be preferable to use the average noise level to adjust the frequency response (step 208), because using the average noise level can limit the impact of short, transient bursts of sound on the overall audio response.

Limiting the effect of short, transient bursts of sound, such as a backfire from a car, can be preferable, because such short, transient burst can be over faster than the audio system can respond. Accordingly, it can be ineffective and inefficient to attempt to adjust the audio response in response to such short, transient bursts of sound. Using the average noise level measurements, however, can reduce or eliminate the inefficiency and ineffectiveness of attempting to adjust the overall response in response to such short, transient bursts. The averaging can further include hysteresis for stability, e.g., by using a continuous moving average of the noise level.

The comparison of step 204 can be made using hardware, software, or both. Additionally, in certain embodiments, the comparison can be made against a plurality of threshold levels as in the example of FIG. 1; however, unlike the example of FIG. 1, the systems and methods described herein are not limited to simply adjusting the gain when a threshold is reached. Rather, in the systems and methods described herein, when the comparison of step 204 indicates that a threshold has been exceeded, the frequency response and/or gain can be adjusted to compensate for the surrounding noise level.

Figure 3A:
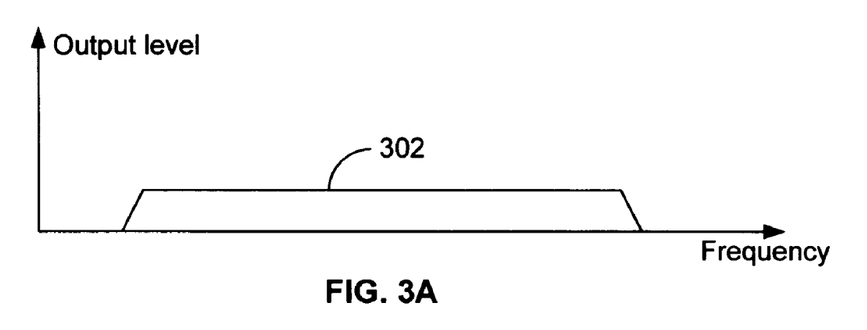
FIG. 3A-3C are diagrams depicting examples of a plurality of frequency responses that can be implemented using the process of FIG. 2.
Figure 3B:
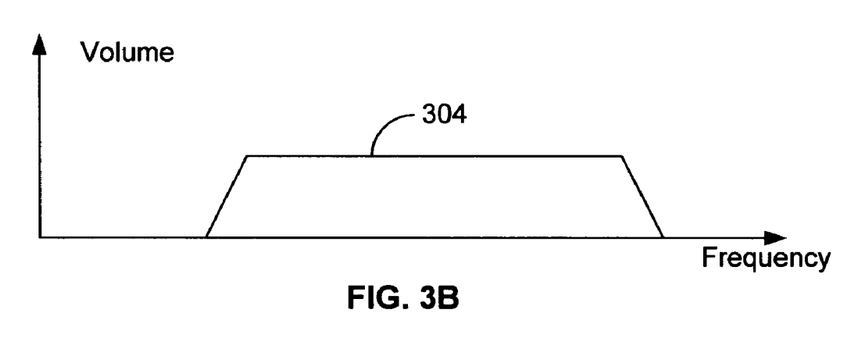
Figure 3C:
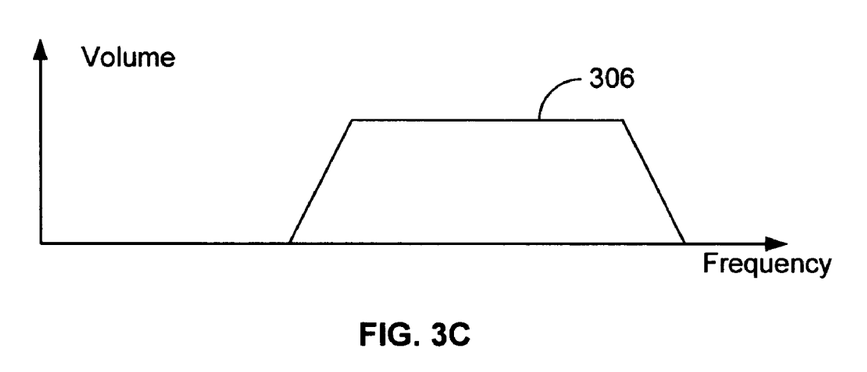

FIGS. 3A-3C, for example, illustrate three potential frequency response curves 302, 304, and 306, respectively, that can be implemented in a mobile communication device configured to implement the systems and methods described herein. As can be seen in FIG. 3A, the initial response can have a relatively wide pass band and a low amplitude, or volume. Response 302 can be used for example, when it is determined (step 204) that the surrounding noise level is low. Frequency response 304 can be used when the comparison of step 204 reveals, e.g., that a first threshold for the surrounding noise level has been exceeded.

Figure 6A:
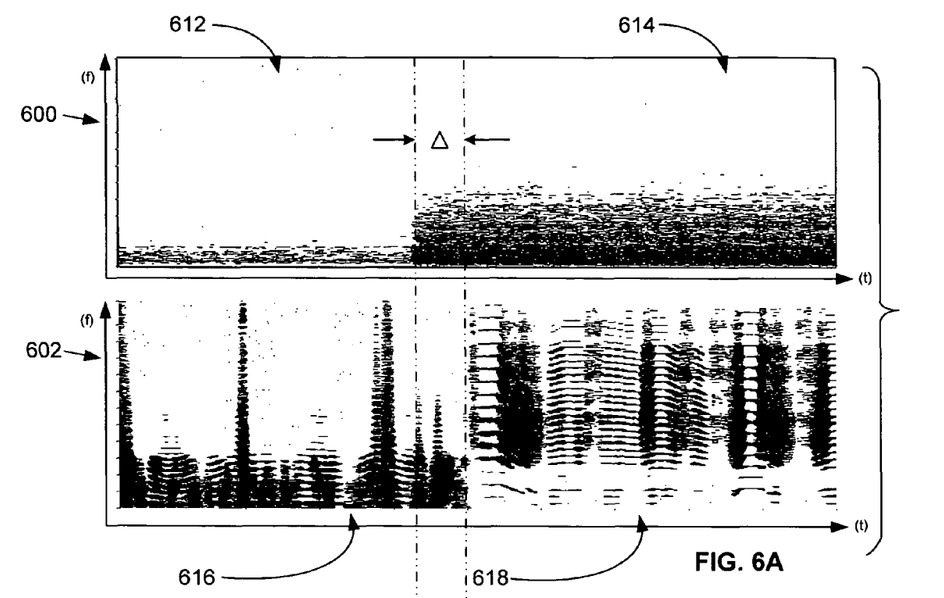
FIG. 6A illustrates spectrograms of a noise signal and a voice signal.

As can be seen, response 304 has a narrower pass band and a higher amplitude, or volume as compared to response 302. The pass band of frequency response 304 is also centered at a higher frequency range than response 302. A response with a higher center frequency and/or narrower pass band can be selected, for example, when the determination of step 206, reveals that the noise in the surrounding environment is dominated by low frequency components. In such situations, selecting a frequency response, such as that illustrated in FIG. 3B, can improve the audio performance by excluding the lower frequencies where the noise resides, or is most prevalent. FIG. 6 and the accompanying description provides greater detail regarding the spectral information (step 206).

FIG. 3C illustrates a frequency response 306 that comprises an even narrower pass band and higher center frequency, as well as an even greater amplitude, or volume as compared to responses 302 and 304. Response 306 can be selected, for example, when the comparison step of 204 indicates that the noise level has exceeded a second threshold and when the determination of step 206 again indicates that the noise is centered in the lower half of the spectrum.

It should be noted that the three responses of FIGS. 3A-3C are by way of example only. In other embodiments, more or less responses can be used. Moreover, response can vary in amplitude alone, or pass band alone. Further, the pass bands do not need to get progressively narrower, nor do they need to possess a progressively higher center frequency. In addition to frequency responses with defined pass bands, high and/or low pass filter responses, defined by certain cutoff frequencies, can also be used. Variations of the example presented by FIGS. 3A-3C will depend on the particular implementation.

In certain embodiments, information related to the spectral content of the noise can be determined in step 206 and the frequency response can be modified accordingly in step 208. In other embodiments, noise can generally be characterized in step 206 and frequency response can be modified based on the general characterization in step 208. For example, "road noise" can tend to have a large amount of low frequency content. Thus, responses that limit the effect of lower frequencies can be selected in step 208 based on a general characterization of the spectral content of the noise that indicates the noise resembles "road noise."

The spectral content of the speech signal being received can also be analyzed or determined in step 206. For example, if the spectral content of the noise mostly resides at lower frequencies, then higher pass bands can be preferable in order to limit the effect of the noise; however, if the speech signal also comprises a lot of content at the lower frequencies, then selecting a higher pass band will also filter out much of the speech signal, which can actually reduce performance. Thus, it can be preferable to analyze both the speech signal as well as the noise signal in order to maintain optimum performance.

In short, the systems and methods presented herein provide methods whereby a mobile communication device can make a determination as to whether the surrounding noise level presents, or potentially presents, a problem. As described, this step can comprise comparing the noise level to a threshold. The system and methods described herein then provide a method whereby the noise environment can be analyzed to determine whether the noise is more prevalent in one part of the spectrum or another, i.e., the lower half of the spectrum. When it is determined, using the systems and methods described herein, that the noise is prevalent, or more prevalent, in a particular region of the spectrum, then a frequency response that excludes, or limits the effect of that part of the spectrum can be selected. Gain adjustment can also be implemented via the systems and methods described herein. In fact, where the noise effects a broad swath of the spectrum, a gain adjustment can be a practical counter measure available.

In certain embodiments, the threshold comparison of step 204 can be eliminated. For example, in certain embodiments, the volume and/or frequency response can be changed linearly as the noise level changes. In such cases, the gain, or volume, can be increased or decreased as the noise level increases, e.g., a 1 dB change in gain for every 1 dB change in the noise level. Although, in some cases, it can be preferable to increase the output volume faster than the noise level increases.

Figure 4:
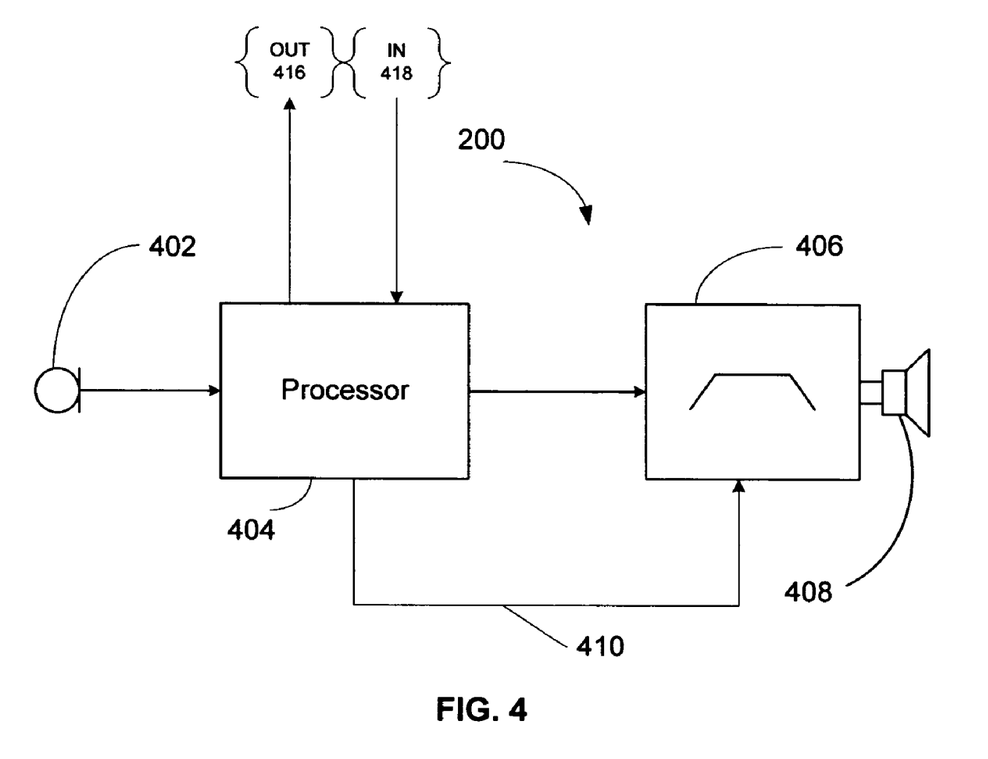
FIG. 4 is a block diagram illustrating an audio system for adjusting frequency response based on noise level in accordance with one embodiment.

FIG. 4 is a simplified block diagram illustrating an example audio system 400 that can be configured to adjust the frequency response of system 400 based on noise level in accordance with the systems and methods described herein. Audio system 400 includes a microphone 402 that can include a transducer configured to convert sound pressure into electric signals. Audio system 400 also includes a processor 404 coupled with microphone 402 and configured to receive electrical signals produced by the transducer included in microphone 402. Processor 404 can be configured to process the electrical signals received from microphone 402 in order to produce an audio output signal 416. Processor 404 can also be configured to receive an input signal 418 and to generate an audio signal therefrom. Processor 404 can include firmware, hardware, or both.

In certain embodiments of audio system 400, other circuitry can be placed between microphone 402 and processor 404. For example, audio system 400 can include an analog-to-digital converter (ADC) between microphone 402 and processor 404. Such an ADC can be used to convert analog signal representing the sound pressure produced by the transducer into digital signals that estimate the sound pressure. An audio system 400 that includes such an ADC can be preferable in embodiments that include a processor 404 configured to receive digital signals. In certain embodiments, processor 404 can include such an ADC.

Audio system 400 can further include a filter 406 coupled with processor 404 and a speaker 408 coupled with filter 406. Filter 406 can be configured to filter the audio signal generated by processor 404 from input signal 418. The filtered audio signal can then be passed to speaker 408, which outputs an audible signal to the user. In certain embodiments, processor 404 can be configured to produce an analog audio signal. In such embodiments, filter 406 can be an analog filter, as long as the response of the analog filter can be varied, e.g., by changing capacitance of a variable capacitor. Alternatively, processor 404 can be configured to produce a digital signal. In such embodiments, filter 406 can be a digital filter, e.g., an Infinite Impulse Response (IIR) or Finite Impulse Response (FIR) filter.

It should be noted that filter 406 can comprise part of processor 404. Additionally, if processor 404 is configured to produce a digital audio signal, a digital-to-analog converter (DAC) can be included in system 400 and configured to convert the digital audio signal into an analog signal that can be output by speaker 408. In certain embodiments, such a DAC can be included in processor 404.

Audio system 400 can also comprise a control signal, or signals, 410 configured to allow processor 404 to control the response of filter 406 in order, e.g., to implement the methods described herein. It will be understood, for example, that the gain and frequency response of digital filters, such as FIR filters, are often defined by coefficients applied to filter taps associated with the filter. Thus, controlling the volume and frequency response of the audio output of system 400 can be accomplished by applying differing sets of filter coefficients to filter 406 in order to control the gain and frequency response of filter 406. In alternative embodiments, additional circuits, either internal, or external to the components illustrated in FIG. 4 can be included in system 400 and configured to enable processor 404 to control the gain and/or frequency response of the audio output produced by system 400. For example, a variable gain amplifier can be included within system 400.

Figure 5:
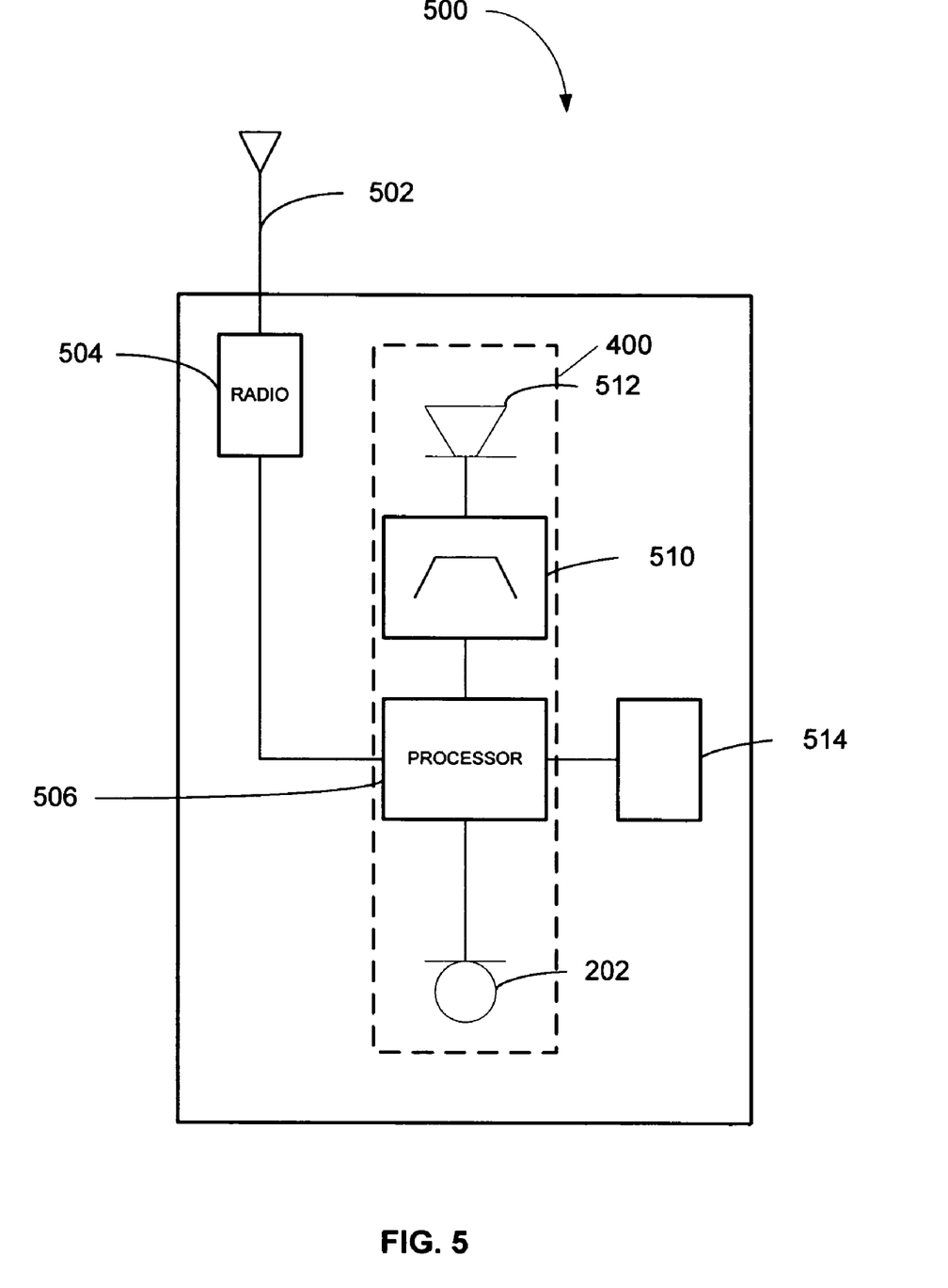
FIG. 5 is an exemplary mobile communication device configured to include the audio system of FIG. 4 and implement the process of FIG. 2.

FIG. 5 is a diagram illustrating a mobile communication device 500 that can include an audio system 400, such as that illustrated in FIG. 4. Mobile communication device 500 can also include an antenna 502 configured to radiate energy into the surrounding environment, or receive energy from the surrounding environment, or both. Mobile communication device 500 can also include a radio 504 coupled with antenna 502 and configured to send or receive radio signals via antenna 502.

Mobile communication device 500 can also include a processor 506 coupled with radio 504. Processor 506 can be configured to control radio 504 and to process signals received from radio 504 and signals for transmission by radio 504. Additionally, processor 506 can be coupled to a microphone 508 included in mobile communication device 500. Microphone 508 can be configured to convert sound pressure around the mobile communication device into an electric signal. The sound pressure can include sound for transmission, such as the voice of the user of mobile communication device 500, and environmental noise from around mobile communication device 500.

Mobile communication device 500 can also include a filter 510 and a speaker 512, which form part of audio system 400 as described above. Processor 506 can be configured to process signals received via antenna 502 and radio 504 and to generate an audio signal therefrom. Processor 506 can be configured to output the audio signal to filter 510 for conversion to sound energy by speaker 512. Processor 506 can also be configured to estimate the noise level based on the input from microphone 508. Processor 504 can be configured to then control filter 510 based on the noise level estimate. In other words, processor 506 can use the signal produced by microphone 508 to determine the surrounding noise level and whether it may interfere with a user's ability to hear an audio signal being produced by speaker 512. Processor 506 can be configured to control filter 510 based on the determination.

Device 500 will often also include a separate memory circuit 514 coupled with processor 506 and configured to store instructions used by processor 506 to implement the systems and methods described herein. In addition, the memory can store data such as filter coefficients used to control the gain and frequency response of digital filter 510.

In certain embodiments, processor 506 can comprise part of a processing circuit already included in device 500. For example, many mobile communication devices will comprise a Mobile Station Modem (MSM), or similar processing device. Conventional MSMs are often capable for making the noise level determinations of step 202. Many conventional MSMs also include digital filters and/or variable gain circuits that can be used to implement the methods described herein. Thus, by altering the programming of such a conventional MSM, e.g., via new code stored in memory 514, a conventional mobile communication device 500 can be configured to implement the systems and methods described herein. Alternatively, the processing and circuitry required to implement the methods described herein can reside partially, or wholly external to any existing processing circuits included in device 500.

FIG. 6A illustrates two spectrograms 600 and 602 that plot the energy and frequency content of a noise signal and a voice signal, respectively, as the signals change over time. In spectrograms 600 and 602, the horizontal axis represent time (t), the vertical axis represent frequency (f). In spectrograms 600 and 602, the grey intensity of each point in the image represents amplitude of a particular frequency at a particular time.

Spectrogram 600 is a spectrogram of environmental noise. Thus, the darker the grey in spectrogram 600, the higher the level of environmental noise. As can be seen, two distinct regions 612 and 614 are apparent in spectrogram 600. The overall noise level of region 614 of spectrogram 600 is higher than the overall noise level of region 612 as illustrated by the darker grey associated with region 614. Additionally, the lower frequencies ranges of each region 612 and 614 have greater noise content than the higher frequencies, as indicated by the darker grey towards the lower portion of each region 612 and 614.

Spectrogram 602 is a spectrogram of an example speech signal. The speech signal of spectrogram 602 includes two regions 616 and 618, corresponding to regions 612 and 614 of spectrogram 600, respectively.

Accordingly, a processor, such as processor 404 can be configured to determine the noise level (step 202) as illustrated by spectrogram 600 at a given time, or over a range of time, e.g., using averaging. Processor 404 can be configured to then determine information related to the noise environment (step 206), such as the spectral information illustrated by spectrograph 600. Based on this information, processor 404 can be configured to adjust the frequency response and/or gain (step 208) to optimize performance of audio system 400 with respect to a user.

For example, in the example of FIG. 6A, a response with a higher pass band can be selected once the overall noise level increases from region 612 to region 614, e.g., based on a threshold comparison (step 204). This can be seen by the significantly reduced spectral content of the lower portion of region 618. For example, a response with a pass band such as that shown in FIG. 3B or 3C can be selected in response to the increased noise level of region 614. Such a frequency response will exclude much of the low frequency noise content, while allowing most of the high frequency speech content to pass. It will also be apparent that a simple high pass filter can also be used in this example, depending on the embodiment and other constraints. Since the noise is most concentrated in the lower portion of the spectrum, as seen in spectrogram 600, selecting a higher pass band can reduce the effect of the surrounding noise, even though the overall noise level is increasing.

Figure 6B:
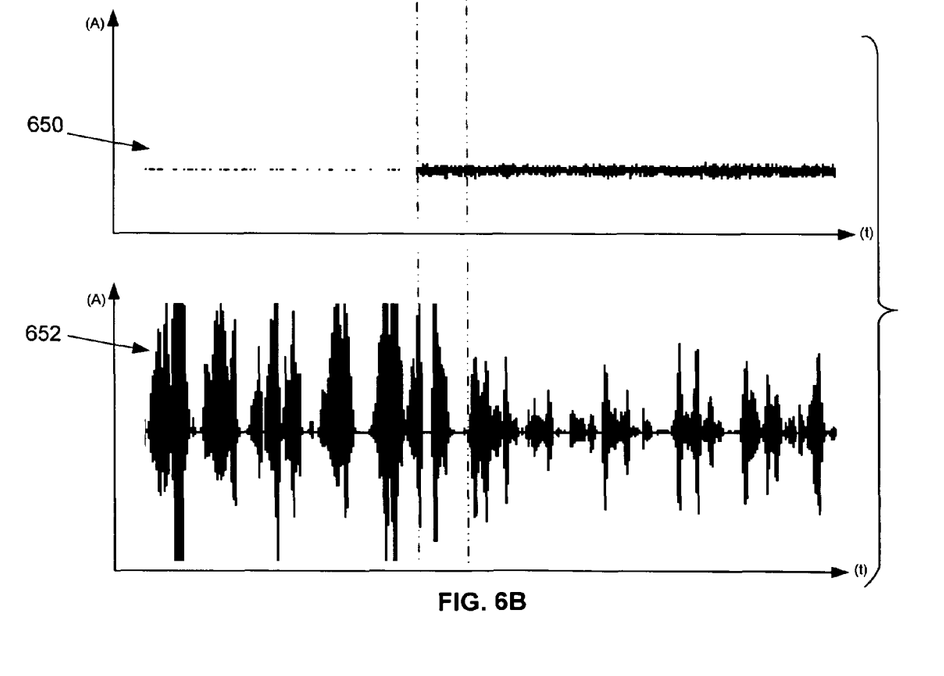
FIG. 6B are graphs of the amplitude versus time of the signals illustrated in the spectrographs of FIG. 6A.

FIG. 6B illustrates plots 650 and 652 of the amplitude (A) versus time (t) of the noise signal and speech signal of spectrograms 600 and 602, respectively. As discussed above, the noise is relatively low during a first time period associated with region 612. During a time period associated with region 614, the noise level increases 12 dB. In response to this increase, the frequency response applied to the speech signal of spectrogram 602 is changed to limit the effect of the noise on the speech signal.

It should be noted that there could be a delay between a change in noise level and a modification in frequency response. This can, for example, be due to processing delays related to measuring environmental noise level, and/or measuring frequency components of environmental noise. The delay (Δ) can be seen in both the spectrograms 600 and 602 and the plots 650 and 652. In spectrograms 600 and 602 the noise level increases in region 614 before the frequency response change illustrated in region 618. Similarly, the 12 dB noise increase in plot 650 occurs before the frequency response change of plot 652

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A mobile communication device, comprising:
an antenna configured to receive signals;
a processor;
a radio coupled with the antenna and the processor, the radio configured to receive the signals from the antenna, extract audio signals from the received signals and pass the extracted audio signals to the processor, where the extracted audio signals include speech signals;
a microphone configured to receive sound from the surrounding environment including noise, the microphone being coupled to the processor, whereby the processor configured to estimate the level of the noise and to determine spectral information related to the noise; and
a filter coupled to the processor and configured to be controlled by the processor responsive the noise level estimation and the determined spectral information, where the processor is configured to adjust the gain response of the filter and a width and a center frequency of a pass band of the filter employed to filter the extracted audio signals so as to exclude frequency components where the noise is prevalent from the extracted audio signals, the frequency components where the noise is prevalent being obtained from the spectral information, wherein the center frequency of the pass band is moved to a higher frequency range if the noise is prevalent in a lower frequency range and wherein the center frequency of the pass band is moved to the lower frequency range if the noise is prevalent in the higher frequency range.

2. The mobile communication device of claim 1, wherein the processor is further configured to process the audio signals.

3. The mobile communication device of claim 1, further comprising a speaker coupled with the filter, the speaker configured to output the processed audio signals.

4. The mobile communication device of claim 1, further comprising a memory coupled with the processor, the memory configured to store filter coefficients, and wherein the filter coefficients control the frequency responses of the filter for a plurality of noise levels.

5. The mobile communication device of claim 4, wherein the processor controls the filters by applying different sets of filters coefficients from the memory to the filter.

6. The mobile communication device of claim 1, wherein estimating the noise level comprises averaging a plurality of noise level measurements over a time period.

7. The mobile communication device of claim 1, wherein the processor is a mobile station modem.

8. The mobile communication device of claim 1, wherein the filter is an analog filter.

9. The mobile communication device of claim 1, wherein the filter is a digital filter.

10. The mobile communication device of claim 9, wherein at least a part of the digital filter is included in the processor.

11. The mobile communication device of claim 6, wherein the averaging further including hysteresis.

12. A method for processing audio output of a mobile communication device comprising:
extracting audio signals from radio signals received via a radio and an antenna, where the extracted audio signals include speech signals;
determining a noise level for noise received via a microphone;

determining spectral information related to the noise received via the microphone and the extracted audio signals received via the radio; and controlling an audio filter employed to filter the extracted audio signals responsive to the determined noise level and the determined spectral information, where the controlling the audio filter comprises controlling the gain response of the audio filter and a width and a center frequency of a pass band of the filter so as to exclude frequency components where the noise is prevalent from the extracted audio signals, the frequency components where the noise is prevalent being obtained from the spectral information, wherein the center frequency of the pass band is moved to a higher frequency range if the noise is prevalent in a lower frequency range and wherein the center frequency of the pass band is moved to the lower frequency range if the noise is prevalent in the higher frequency range.

13. The method of claim 12, wherein the noise level determination comprises measuring a noise level at a plurality of times and averaging the measurements.

14. The method of claim 12, wherein controlling the frequency response comprises applying a set of filter coefficients to the audio filter.

15. The method of claim 12, further comprising processing the audio signals and filtering the audio signals using the audio filter.

16. The method of claim 12, further comprising comparing the determined noise level to a threshold and controlling the filter based on the comparison.

17. The method of claim 12, further comprising comparing the determined noise level to a plurality of thresholds and controlling the filter based on the comparison.

18. The method of claim 12, wherein determining spectral information related to the noise signal comprises determining that the noise signal comprises high spectral content in a low frequency range, and wherein controlling the audio filter comprises controlling the audio filter such that it reduces the effect of the low frequency range.

19. The method of claim 13, wherein the averaging further including hysteresis.

20. The method of claim 12, wherein determining spectral information related to the noise signal comprises determining that the noise signal comprises high spectral content in a high frequency range, and wherein controlling the audio filter comprises controlling the audio filter such that it reduces the effect of the high frequency range.

* * * * *